Oct. 24, 1944.   C. A. WIKEN   2,360,921
DRILL PRESS
Filed Aug. 4, 1941   3 Sheets-Sheet 2
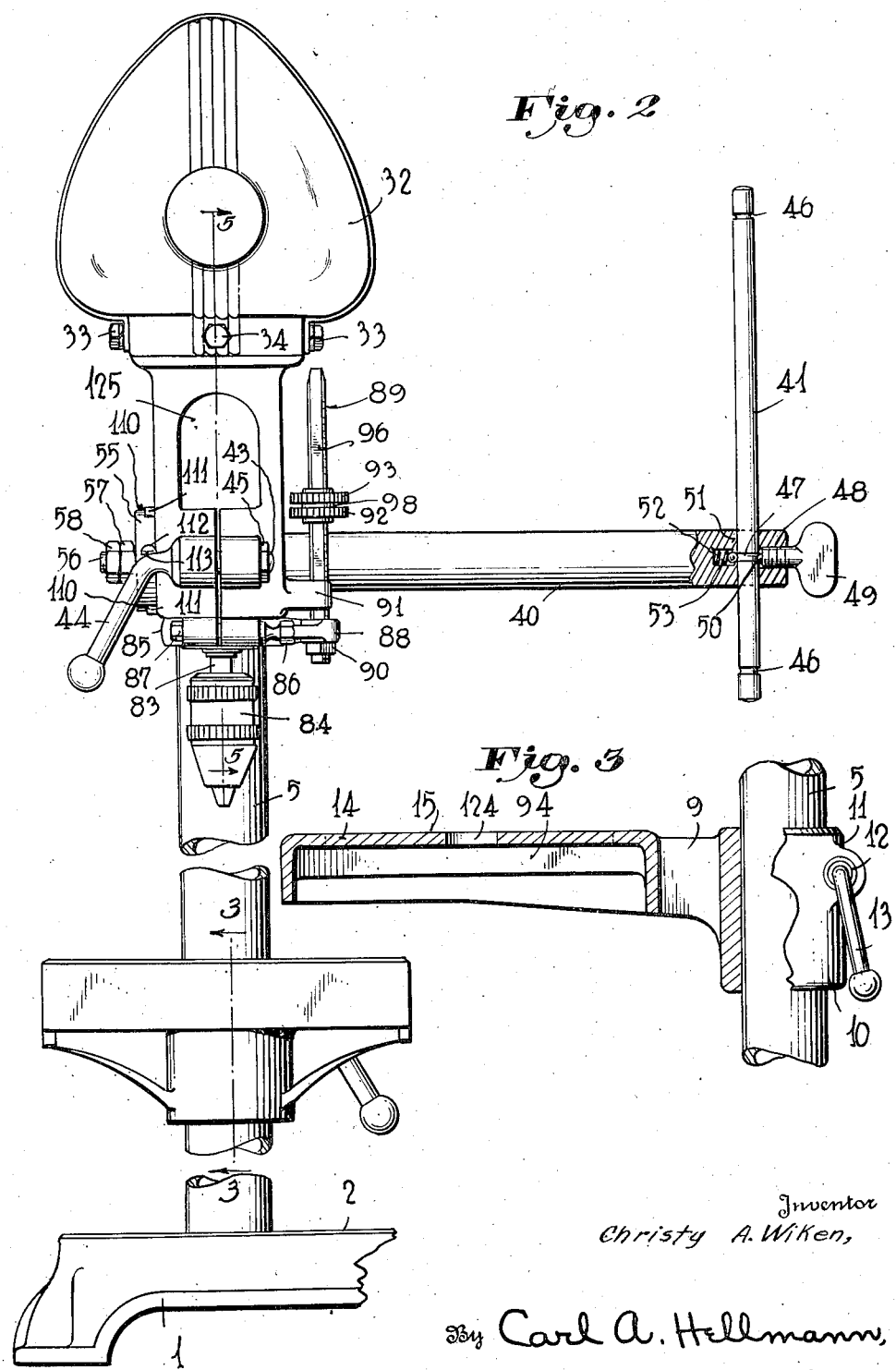
Inventor
Christy A. Wiken,
By Carl A. Hellmann,
Attorney Oct. 24, 1944.  C. A. WIKEN  2,360,921
DRILL PRESS
Filed Aug. 4, 1941  3 Sheets-Sheet 3
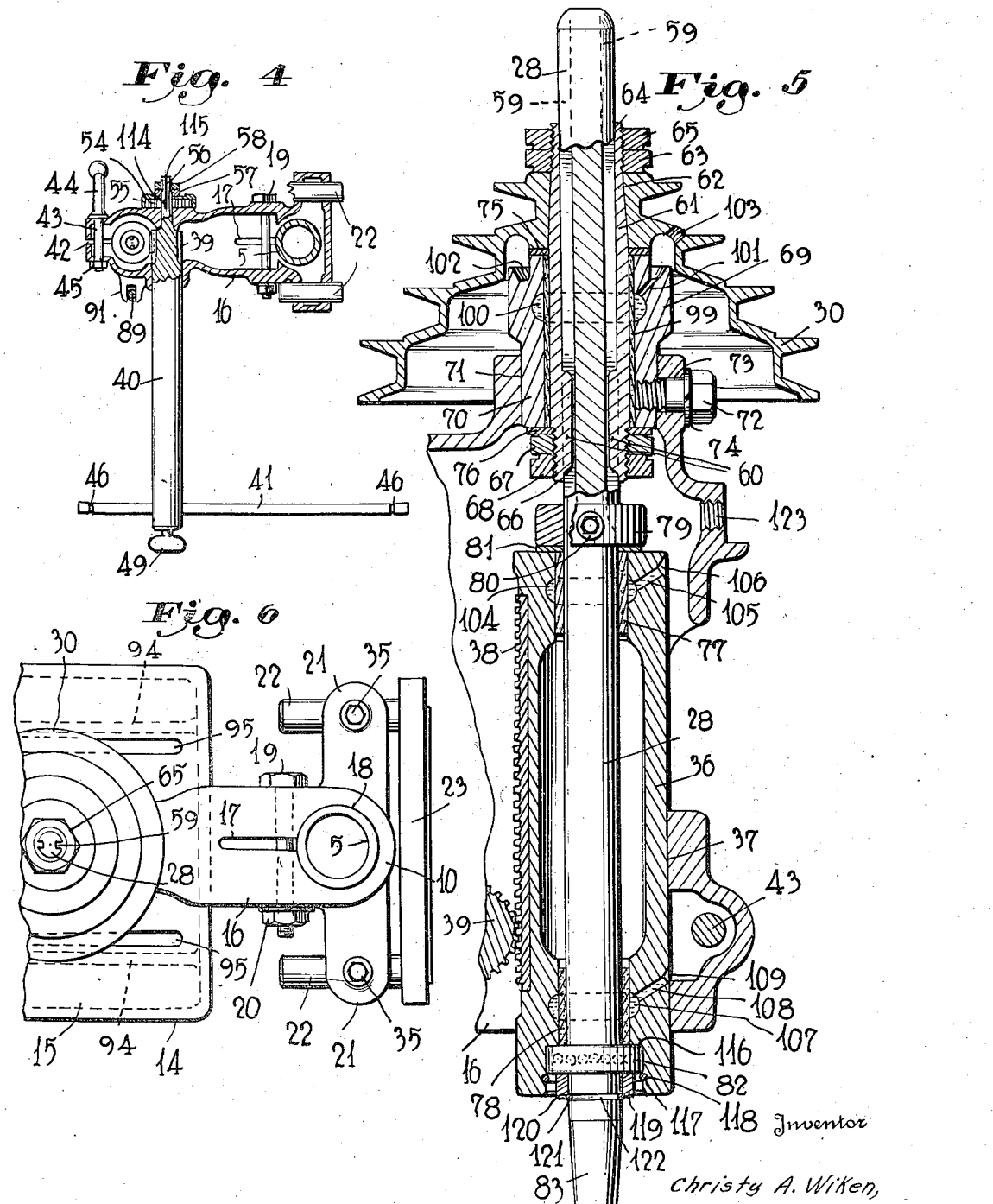

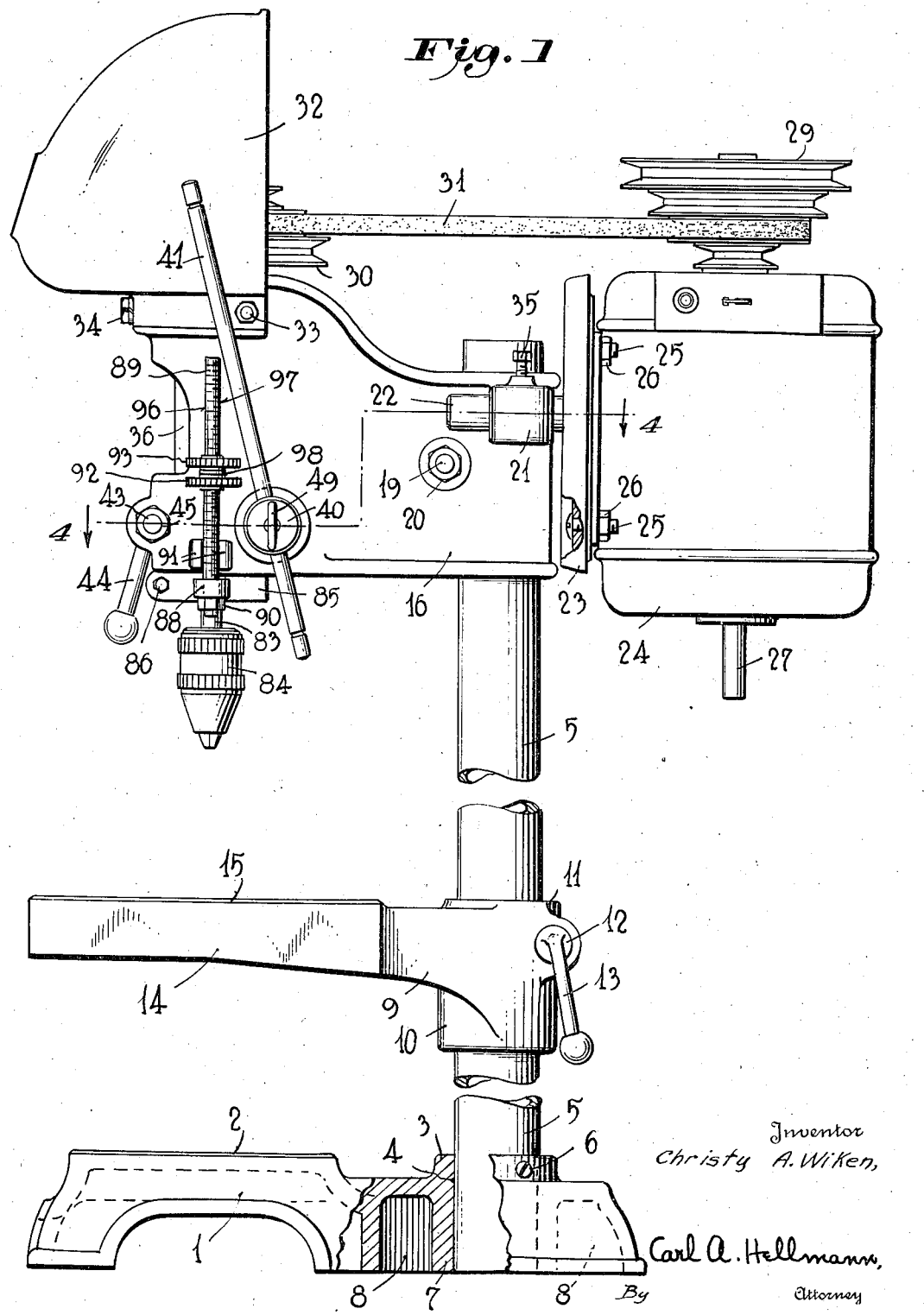

Patented Oct. 24, 1944

2,360,921

UNITED STATES PATENT OFFICE 2,360,921

DRILL PRESS

Christy A. Wiken, Milwaukee, Wis., assignor, by mesne assignments, to Delta Manufacturing Company, Milwaukee, Wis., a partnership consisting of Marshall Field, Charles G. Cushing, and H. Campbell Stuckeman Application August 4, 1941, Serial No. 405,404

4 Claims. (Cl. 77—5)

The present invention relates to improvements in drilling machines.

More specifically, it relates to improved and simplified constructions of machines of this kind whereby a highly satisfactory drill press may be manufactured at a relatively low cost.

An object of the invention is to provide a drill press made of units or assemblies which may be readily taken apart and reassembled without disturbing the alinement of the working parts.

A feature is to provide improved and simplified bearings and means for lubricating them and to provide means preventing the entrance of dust and the like into the lubricant.

Another feature is to provide parts so fitted to one another that the drill spindle will transfer a portion of the stresses, produced in the drive pulley by the belt, to spindle bearings in the quill.

Other objects and advantages of the invention will be explained and disclosed in the present specification, in connection with the drawings accompanying the same and forming a part thereof, illustrating a drill press embodying a preferred form of the invention.

In said drawings:

Fig. 1 is a side elevation, partly broken away and in section, of a bench-type drill press together with a motor for driving the same, the supporting column being broken away at two locations;

Fig. 2 is a front elevation of the drill press also partly broken away and partly in section, to illustrate certain details;

Fig. 3 is a fragmentary detail view, partly in section on the plane indicated by the line 3—3 of Fig. 2, to show the structure of the table and its support;

Fig. 4 is a sectional view on a smaller scale, through the frame of the drill press, on the horizontal planes indicated by the broken line 4—4 of Fig. 1;

Fig. 5 is a fragmentary elevation partly in section and on a very much enlarged scale, on the plane indicated by the line 5—5 of Fig. 2, passing longitudinally through the axis of the drill spindle, the pulley-guard and the chuck being omitted; and Fig. 6 is a fragmentary plan view on the same scale as Fig. 1, the belt guard, belt and motor being omitted.

In all the figures corresponding elements are indicated by the same reference characters.

Referring first to Fig. 1 it will be seen that the machine illustrated has a base 1, having a plane upper surface 2 which may serve as a work table, and which may have the customary holes and slots therein for securing work pieces, or holding devices for work pieces, thereto. The base 1 also has a lug 3 formed thereon and bored as shown at 4 to provide a cylindrical opening to receive the drill column 5, said lug also having one or more holes therein such as 6 which are screw threaded to receive set screws for holding the drill column rigidly in position. It will be noted that below the collar or lug 3 there is a tubular continuation 7 thereof, reaching substantially to the lower edge of the base and supported by a plurality of substantially radial ribs 8, extending from said portion 7, to provide a very stiff and rigid support for the column 5.

While the table top 2 of the base 1 itself may often serve as the work table of the drill press, it is desirable to have also an additional work table which may slide up and down the column 5. This is provided by the member 9, which has a tubular portion 10 slidable along the column 5 and split substantially radially in the rear at 11, so that a bolt 12 having a handle 13 attached thereto for manipulating it may serve to hold the member 9 at any desired position along the column, by tightening the two parts of the slotted tubular member 10 on said column. The member 9 has a forwardly extending portion 14 having a substantially plane upper surface 15, serving as a work table. Slots and holes of the customary kinds may be provided in the table 14, to assist in clamping or otherwise holding work pieces thereon.

The table 14 has of course the central hole 124 therein, which will be substantially alined with the drill spindle when the parts are in the normal position shown in Fig. 2. To combine strength with lightness, the table preferably is made relatively thin as shown by the sectional view in Fig. 3, and is provided with ribs 94 extending substantially parallel to the slots 95, which are shown in Fig. 6.

Also mounted upon the column 5 so as to be capable of sliding therealong, is the frame 16 which carries the drilling mechanism proper, as well as the source of power for operating said mechanism. In order to secure the frame 16 at the desired elevation on the column 3, it has therein a slot 17 as shown in Fig. 6, extending into the bore 18 which fits on the column 5, and a bolt 19 extends through the slotted portion of the frame so that by tightening the nut 20 thereon the bored portion 19 may be caused to grip tightly on the column 5. As this frame adjustment ordinarily need be made only seldom, it is not necessary to provide a manually operable handle on the nut 20, although this may be done of course, if preferred.

Two lugs 21 extending in opposite directions from the frame 16 are bored to receive the pins or studs 22, so that they may slide through the bores. These studs are secured to or integral with the motor mounting plate 23, to which the motor 24 may be secured, as by the bolts 25 and the nuts 26. The motor shaft 27 has thereon a pulley 29 connected by a belt 31 to a pulley 30 on the drill spindle 28. For convenience in providing a number of different speed ratios, pulleys 29 and 30 are made as companion cone pulleys, and in order to protect the operator, a pulley guard 32 preferably is secured to the frame 16 as shown, by the cap screws 33 and 34. The belt 31 may be adjusted to the proper tension by shifting the studs 22 in their respective lugs 21, whereupon the adjustment may be maintained by tightening the set screws 35.

A quill 36 is mounted to slide vertically in a bore 37 near the front end of the frame 16, and has a rack 38 cut therein or mounted thereon. This rack is in engagement with a pinion 39 at one end of a shaft 40, shown in Fig. 4, so that when said shaft is turned by means of the handle or lever 41, the quill 36 will be moved correspondingly. The frame 16 is slotted in front as shown at 42, and a bolt 43, having a handle 44 for manual operation, cooperates with a nut 45 to make it possible to clamp the quill in adjusted position, if and when desired.

The handle or lever 41 is preferably a cylindrical rod as shown, with a groove 46 near each end thereof and a similar groove 47 at an intermediate point. The shaft 40 has a threaded opening 48 in its end as shown in Fig. 2 to receive the thumb screw 49, which has a pointed end 50 that will fit in any one of the grooves of the lever 41, which slides through a transverse bore 51 in the shaft 40. The bore 48 intersects the bore 51 and a reduced portion thereof extends inward beyond it, to provide a housing for the coiled spring 52 and the ball 53 as shown.

When the thumb screw 49 is loosened, the rod 41 may be slid to cause the ball 53 to engage in any one of the grooves 46 and 47, and thus provides a rapid change of leverage when desired, as the ball will hold the rod 41 securely enough to prevent it from falling out or shifting its position, while the thumb screw 49 will lock the rod 41 securely in one of the grooves, or even in any intermediate position, which will provide a selected leverage and throw convenient for the operator and satisfactory for the work being done.

In order to restore the quill 36 to its normally upper position in the frame, it is preferred to utilize a spring 54 secured at its outer end 112 in a slot 113 of the housing 55, which is mounted on the frame 16, and having its inner end secured to the reduced end 56 of the shaft 40, so that the spring 54, when unwinding, in the manner of the ordinary clock spring, will turn the shaft 40 in the proper direction to cause the pinion 39 to raise the quill 36.

The end 56 of the shaft 40 is preferably threaded to receive a nut 57 and a lock nut 58, as shown in Fig. 4. These serve to hold the housing 55 in place and also to hold the shaft 40 itself in proper position, while at the same time making it easy to assemble or dismantle the parts. The housing is provided with slots 110 as shown in Fig. 2, which engage on lugs 111 of the frame 16, to prevent the housing from turning, and is provided also with a further slot 113 which receives the outer end 112 of the spring 54 to hold it against turning freely.

The inner end 114 of the spring is engaged in a slot 115 in the reduced end 56 of the shaft 40, as shown in Fig. 4. This slot extends to the extreme end of the shaft, and is open at such end, making it easy to insert the inner end of the spring thereinto while the shaft 40 is withdrawn (downward from the position shown in Fig. 4) so that the pinion 39 will be out of engagement with the rack 38 on the quill. The shaft 40 then may be turned by means of the lever 41 to wind the spring 54 to the desired tension, whereupon the shaft 40 is pushed into the frame 16 as far as it will go, and the nuts 57 and 58 are tightened to hold the parts in the desired adjusted position.

The novel spindle and quill assembly of the device will now be described.

The spindle 28 has two oppositely located grooves 59 extending from its upper end to about the level of the top of the quill 36, as shown clearly in Fig. 5. These grooves or keyways afford sliding engagement for the keys or splines 60 in the tubular sleeve 61, which carries the pulley 30. It will be noted that a slight taper is provided as shown at 62 on the interengaging parts of the sleeve 61 and the pulley 30, that is, these parts are frusto-conical, with a relatively slight vertical conical angle, so that they may be engaged firmly upon one another by forcing the pulley upon the taper sleeve, for example by means of the nut 63 engaging the threads 64 at the end of the sleeve. By turning down this nut 63 until the parts are secured together firmly and then tightening the lock nut 65, a simple and yet highly satisfactory and secure driving connection is provided.

The sleeve 61 is threaded also at its lower end as shown at 66, to receive a nut 67 and lock nut 68. A bearing sleeve 69 has a reduced lower portion 70 which fits within a corresponding bore 71 formed in a portion of the frame 16 as shown and may be secured in position by means of a cap screw 72 threaded into the portion 70 and passing through a hole 73 in the frame 16, a lock washer 74 being provided to prevent the cap screw 72 from working loose.

A suitable anti-friction washer 75, preferably made of fibre or the like, is placed between the pulley 30 and the upper end of the bearing bushing 69 as shown, and another such washer 76 is placed beneath said bushing. The sleeve 61 carrying the pulley 30 is thus free to rotate about a vertical axis in the porous bronze lining 69 carried in the bushing 69, and in so turning will carry along the splined shaft or spindle 28, without however preventing said shaft from moving vertically, since the keys 60 provided on the sleeve 61 will slide along the keyways 59. By adjusting nuts 67 and 68 the proper degree of end play of sleeve 61 may be accurately established and maintained.

The spindle 28 is mounted for rotation in the quill 36, which has alined bushings 77 and 78 therein providing bearings for the spindle. A collar 79 engages said spindle above the quill 36 and preferably is secured to the spindle by means of a hollow set screw 80 as shown. An anti-friction washer 81 is interposed between the bottom of the collar 79 and the top of the quill. At the lower end of the quill a thrust bearing is mounted as shown, to carry the stress produced by the pressure of the drill or other tool on the work piece, preferably a ball bearing 82 as shown. At the lower end 83 the spindle has a suitable shape to cooperate with a chuck 84 or other device, a frusto-conical taper being shown.

The ball thrust bearing 82 bears against a shoulder 116 within the quill 36, and is retained against falling or moving downward by means of a ring 117 which may be formed of any suitable material, preferably consisting of a resilient split ring of wire, which is seated in a groove of less depth than the diameter of the wire, so as to provide a shoulder which holds the thrust bearing in place. A collar 119 having a beveled inner portion 120 at its lower end, as shown, engages over a soft wire ring 121 partly embedded in a shallow groove 122 formed in the drill spindle 28, so that upward pressure exerted on said spindle will merely wedge the ring 121 more tightly into the collar 119, which in turn transmits the thrust to the bearing 82.

Means for limiting the descent of the quill may be provided, in the present instance consisting of a split collar 85 which may be engaged about the lower end of the quill as shown in Figs. 1 and 2, and secured by means of the bolt 86 and nut 87. This collar has a projection or lug 88 which in turn carries the threaded vertical rod 89, which may be secured thereto in any suitable way, for example, by threading the rod 89 through the lug 88 and securing it firmly by means of the lock nut 90. The rod 89 is preferably flattened as shown at 96 and 97, and a lug 91 extending from frame 16 and having a bifurcated end, straddles the rod 89 as shown best in Fig. 1, engaging over the flat sides 96 and 97. A manually-operable preferably knurled nut 92 is threaded upon the rod 89 as shown, and cooperates with a similar nut 93, so that one of these nuts will act as a lock nut for the other. A washer 98, having a hole with flattened sides, and thus capable of sliding on rod 89, but prevented from turning, is placed between these two nuts. By adjusting the nut 92 up or down on the rod 89, the range of vertical motion of the quill may thus be controlled, as the motion automatically will be stopped when the lower surface of the nut 92 engages the top of the bifurcated lug 91.

In order to simplify the mounting and lubrication of the drill spindle, a sleeve 99 of porous bronze is provided within the bushing 69, the tubular member 61 rotating freely within said sleeve. An annular reservoir 100 is also provided in the bushing 69, and has an inclined passage 101 extending upward and outward therefrom to the bottom of the annular trough or gutter 102 at the top of the said bushing. It will be noted that the upper edge or lip of the annular reservoir 102 is spaced fairly close to the surrounding pulley 30, thus practically sealing said reservoir against the entrance of dust or other foreign matter. A hole 103 is provided in the pulley 30, so that the spout of an oil can may be inserted through such pulley, whereby oil may be supplied to the trough 102, whence it feeds by gravity to the reservoir 100 and thence through the porous metal 99 to the rotatable sleeve 61.

A similar expedient is employed in the two bearings 77 and 78 which support the spindle 28 at the two ends of the quill 36. The upper porous bronze sleeve 77 is surrounded by the annular oil reservoir 104 which communicates through the inclined passage 105 with the oil hole 106, while the lower porous bronze bushing 78 similarly receives oil from the annular reservoir 107, fed with oil by means of the inclined passage 108 leading to the oil hole 109. Both of these oil holes are accessible from the front of the drill press when the quill is lowered slightly, thus making it easy to oil the spindle bearings.

The operation of the drill press will presumably be obvious from the structure thereof. It may be desirable however to summarize it briefly as follows:

A suitable motor 24 is mounted upon the plate 23 and adjusted until its shaft 27 is vertical, that is, parallel to the drill spindle. The cone pulleys 29 and 30 should be alined properly so that the belt 31 may connect any selected steps thereof in driving relationship, any necessary adjustment of the belt tension being made by loosening the set screws 35 and moving the studs 22 forward or back, whereupon the set screws are again tightened.

It will be noted that the frame 16 and the parts carried thereby constitute a complete unit which may be moved up or down on the column 5 or turned about the axis of the latter to bring the drill spindle into proper position for the work to be done. The two runs of the belt 31 will be on opposite sides of the column 5 no matter on which steps of the cone pulleys the belt happens to be, and therefore the belt does not interfere with lowering the frame 16 on the column 5.

The work table 9 may be used to hold the work pieces and of course may be moved up or down on the column 5, or pivoted about the axis of said column, as may be necessary, and then clamped by means of the handle 13. When it is desired to use the upper surface 2 of the base 1 as a work table, the work table 9 may be swung completely out of the way, which is particularly useful in drilling long or tall objects.

Attention is directed to the fact that the drill spindle 28 may be removed bodily by loosening the set screw 80 which holds the collar 79, whereupon a different spindle may be inserted. This is advantageous where interchangeable spindles having various attachments at their lower ends are to be used, as it saves time that would otherwise be consumed in fitting and centering different chucks or tools on the spindle. However it is of course also possible to provide a series of chucks or other devices which will fit interchangeably on the tapered lower end 83 of the spindle illustrated.

The spindle may be made of ordinary "cold-rolled" steel rod or shafting, by reason of the fact that the collar 119 is held in place by the soft wire ring 121, which eliminates the need for the special steel castings or forgings which would otherwise be required, if the collar were made integral with the spindle.

The spindle is supported by three porous bronze bushings, 99, 77, and 78 which are automatically alined with one another by reason of the fact that the steel bushing 69 and the quill 36 are mounted in a single bore in the frame 16.

It follows also from this construction that it is very easy to take apart and reassemble the drill press, since the bushing 69 and the parts carried thereby may be removed bodily by removing the cap screw 72, when the entire assembly comprising the cone pulley 30, sleeve 61, and steel bushing 69 may be lifted out as a unit, without disturbing any other parts of the drill press.

It will be noted that the collar 79 is shown as secured to the spindle 28 by a set screw 80 of the hollow "Allen" type, which is operated by inserting a hexagonal rod into the set screw. This makes it easy to tighten and loosen the collar 79, as the wrench may be inserted through the threaded opening 123 shown in Fig. 5, which normally receives the cap screw 34 for holding the guard 32 in place, or the quill may be lowered part way to bring the screw opposite the large opening 125 in frame 16.

When the quill 36 is lowered slightly from the position shown in Fig. 5, the two oil holes 106 and 109, both of which are located directly in front, become visible and very easily accessible to the operator, thus reminding him continually of their existence and facilitating the oiling of the two spindle bearings in the quill. The upper bearing 99 may also be oiled easily as already stated, without removing any part of the drill press, not even the guard 32, by inserting the spout of an oil can through the hole 103 in the cone pulley, which may be turned to bring said hole to the rear for this purpose.

It will be seen that the sleeve 61 which carries the cone pulley 30 is supported on a bearing 99 which extends far up into the pulley, thus avoiding the undesirable effects of an overhanging pulley. The spindle 28 is supported by three bearings at all times and also fits closely enough in the sleeve 61 (say .002" clearance) to aid in supporting the same by transferring some of the belt load to the bearings 77 and 78, except when the spindle is in its lowermost position. However this is a more or less abnormal position of the spindle and as a rule is never kept very long in the ordinary operation of the drill press, and is therefore not objectionable. It is not intended however that the quill should be locked for any length of time in its lowest position while the spindle runs at maximum speed, as this may cause excessive heat and undue wear.

While the invention has been disclosed herein by reference to a specific embodiment thereof at present believed to be a preferred form, it should be clearly understood that this has been done solely by way of example and not in any sense as a limitation to the specific form disclosed. Obviously the invention may be embodied in numerous other forms wherein certain of the features above disclosed are modified or omitted and wherein additional features may be included, etc.

For an understanding of the scope of the invention reference should therefore be had solely to the following claims.

I claim:

1. In a drill press, a head structure; a quill guided for vertical reciprocation in said head structure; a spindle journalled in widely vertically spaced bearings in said quill and projecting upwardly through a single opening located in said head structure above said quill and aligned with said quill; a single hollow bearing support seating in said opening and removable therefrom by moving it axially upwardly away from said quill; a sleeve slidably fitting over said spindle and journalled in bearing means in said bearing support; means for establishing and maintaining a driving connection between said sleeve and spindle in all shifted positions of said quill; means for limiting downward movement of said sleeve in said bearing support; means for precluding upward movement of said sleeve out of said bearing support, said last-named means being of smaller diameter than said opening, and the space above said opening being unobstructed, whereby said bearing support, said bearing means and said sleeve may be inserted in said opening and is axially removable upwardly from said opening as an assembled unit, said unit being insertible and removable without disturbing said quill and spindle by sliding said sleeve along said spindle, in any adjusted position of said quill; and means for locking said bearing support against removal when it is in place in said opening.

2. A unitary drill press driving pulley assembly adapted to be installed in assembled relationship in an opening in a drill press head, comprising an elongated cylindrical member having a portion designed to seat in said opening; a bearing means mounted in said member, the latter having an annular recess surrounding said bearing means intermediate its length; a sleeve journalled in said bearing means; a stepped pulley having a small diameter hub portion secured to the upper end of said sleeve; thrust bearing means between said hub and the upper end of said member; thrust bearing means secured to the lower end of said sleeve and cooperating with the bottom of said member to prevent upward removal of said sleeve from said member but being of sufficiently small diameter to freely pass through the opening in the drill press head; an upwardly facing annular recess in said member at a higher level than said annular groove and having duct means placing it in fluid communication with the latter, for establishing a static head of lubricant around said first mentioned bearing means, said pulley extending downwardly in enclosing relationship with said member and having an inwardly extending portion closely surrounding said member below the level of said annular recess, to thereby form a substantially closed chamber and protect said annular recess against the entrance of extraneous material; and an opening in said pulley above the level of said annular recess for feeding lubricant thereto.

3. In a drill press, a head; a quill mounted for vertical reciprocation in said head and having a spindle journalled therein and projecting upwardly above said quill, said head having a single opening receiving the upper end of said spindle and having a comparative long cylindrical wall disposed in parallel, spaced relationship thereto, said cylindrical wall terminating at its lower end adjacent the upper end of said quill when the latter is in its uppermost shifted position; and a unitary spindle driving assembly secured in said opening and adapted to be applied to and removed from said head as a unit without disassembling any parts thereof and without disturbing said quill, comprising a sleeve-like support fitting in said opening and snugly engaging the cylindrical wall thereof; means for releasably securing said support in place in said opening; a sleeve journalled in said support; a pulley secured to the upper end of said sleeve in overhanging relationship to said support and having a hub operable to limit downward movement of said sleeve in said support; thrust bearing means secured to the lower end of said sleeve and cooperating with a thrust face on said support to prevent upward removal of said sleeve from said support, said thrust bearing means being of smaller overall diameter than said opening in said head, whereby it may be passed upwardly therethrough when said support is released and removed from said opening, said sleeve snugly and slidingly receiving the upper end of said spindle and embodying means for drivingly connecting it to said spindle in all vertically shifted positions of said quill.

4. The drill press structure defined in claim 1, wherein said head structure has a hollow front portion and said quill is provided with upper and lower portions, which, in the raised position of the quill are disposed behind vertically spaced portions of the front of said head structure, and said quill is movable downwardly to render said portions exposed at the front of the head; and said spindle is journalled in a pair of bushings located in said upper and lower portions of said quill, with an annular groove in said quill surrounding each of said bushings, and ducts opening onto the front of said quill for supplying lubricant to said grooves, said ducts being closed by said vertically spaced portions of the head when said quill is disposed in its raised position, and are adapted to be exposed when the quill is moved downwardly a predetermined distance.

CHRISTY A. WIKEN.